US010665262B2

(12) United States Patent
Tanouchi et al.

(10) Patent No.: US 10,665,262 B2
(45) Date of Patent: May 26, 2020

(54) AMPLIFIER SELECTION DEVICE, AMPLIFIER SELECTION METHOD, AND COMPUTER-READABLE STORAGE MEDIUM HAVING POWER SOURCE CAPACITY DISPLAY FUNCTION

(71) Applicant: FANUC CORPORATION, Yamanashi (JP)

(72) Inventors: Hironao Tanouchi, Yamanashi (JP); Shinichi Mizukami, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 66 days.

(21) Appl. No.: 16/128,514

(22) Filed: Sep. 12, 2018

(65) Prior Publication Data
US 2019/0088282 A1 Mar. 21, 2019

(30) Foreign Application Priority Data

Sep. 19, 2017 (JP) .................. 2017-179498

(51) Int. Cl.
G06Q 30/06 (2012.01)
G11B 19/247 (2006.01)
G06F 16/25 (2019.01)
G06F 16/20 (2019.01)
G05B 19/414 (2006.01)
G06F 1/28 (2006.01)
(Continued)

(52) U.S. Cl.
CPC .......... G11B 19/247 (2013.01); G05B 19/414 (2013.01); G06F 1/28 (2013.01); G06F 16/20 (2019.01); G06F 16/252 (2019.01); G11B 19/025 (2013.01); G05B 2219/50234 (2013.01); H02P 31/00 (2013.01)

(58) Field of Classification Search
None
See application file for complete search history.

(56) References Cited

U.S. PATENT DOCUMENTS 5,943,245 A * 8/1999 Melfi ...................... G06F 17/50
703/1
2015/0242923 A1* 8/2015 Kreidler ............. G06Q 30/0623
705/26.61

FOREIGN PATENT DOCUMENTS

JP 2006-260350 A 9/2006
JP 2007-293532 A 11/2007
(Continued)

Primary Examiner — Muhammad S Islam
(74) Attorney, Agent, or Firm — Hauptman Ham, LLP

(57) ABSTRACT

An amplifier selection device includes: a storage that stores a database containing motor models and information pertaining to amplifier capacities and feature amounts; a means that obtains motor model information; a means that calculates a number of amplifiers; a means that selects spindle amplifiers; a means that creates a combination of servo amplifiers and spindle amplifiers; a means that extracts information pertaining to the feature amounts; a means that determines a combination on the basis of the information pertaining to the feature amounts; a power source capacity calculation means that calculates capacities of a main power source and a control power source; a means that calculates a total power consumed by motors; and a display control means that displays the combination of amplifiers and time series data of the total value of the power consumed by the motors along with the main power source and control power source capacities.

15 Claims, 13 Drawing Sheets

(51) Int. Cl.
*G11B 19/02* (2006.01)
*H02P 31/00* (2006.01)

(56) References Cited

FOREIGN PATENT DOCUMENTS

| | | |
|---|---|---|
| JP | 2008-295217 A | 12/2008 |
| JP | 2011-166953 A | 8/2011 |
| JP | 2015-192475 A | 11/2015 |

* cited by examiner

| AXIS | MOTOR MODEL | AMPLIFIER CAPACITY |
|---|---|---|
| X-AXIS | αiS×××× | 20A |
| Y-AXIS | αiS○○○○ | 20A |
| Z-AXIS | αiS△△△△ | 20A |
| A-AXIS | αiS▽▽▽▽ | 40A |
| B-AXIS | αiS◎◎◎◎ | 40A |
| SP | αiI□□□□ | 5.5kW |

FIG. 6

|  | AMPLIFIER CAPACITY | NUMBER |
|---|---|---|
| SERVO AXIS | 4A | 0 |
|  | 20A | 3 |
|  | 40A | 2 |
|  | ... | ... |
|  | 360A | 0 |
| SPINDLE AXIS | 2.2kW | 0 |
|  | 5.5kW | 1 |
|  | ... | ... |
|  | 55kW | 0 |

EXAMPLE OF CALCULATING OUTPUT PERCENTAGES FROM PROGRAM

1: ROTATE X-AXIS SERVO MOTOR AT 70% OF RATING
2: AFTER 4 SEC, ROTATE Y-AXIS SERVO MOTOR AT 40% OF RATING
3: AFTER 6 SEC, ROTATE Z-AXIS SERVO MOTOR AT 60% OF RATING

| AXIS | MOTOR MODEL | AMPLIFIER CAPACITY |
|---|---|---|
| X1-AXIS | $\alpha$ iS×××× | 20A |
| X2-AXIS | $\alpha$ iS◇◇◇◇ | 20A |
| Y1-AXIS | $\alpha$ iS○○○○ | 20A |
| Y2-AXIS | $\alpha$ iS☆☆☆☆ | 20A |
| Z1-AXIS | $\alpha$ iS△△△△ | 40A |
| Z2-AXIS | $\alpha$ iS●●●● | 40A |
| A-AXIS | $\alpha$ iS▽▽▽▽ | 20A |
| B-AXIS | $\alpha$ iS◎◎◎◎ | 40A |
| SP | $\alpha$ iI□□□□ | 11kW |

FIG. 15

| | AMPLIFIER CAPACITY | NUMBER |
|---|---|---|
| | 4A | 0 |
| | 20A | 5 |
| SERVO AXIS | 40A | 3 |
| | ... | ... |
| | 360A | 0 |
| | 2.2kW | 0 |
| | 5.5kW | 0 |
| SPINDLE AXIS | 11kW | 1 |
| | ... | ... |
| | 55kW | 0 |

AMPLIFIER SELECTION DEVICE, AMPLIFIER SELECTION METHOD, AND COMPUTER-READABLE STORAGE MEDIUM HAVING POWER SOURCE CAPACITY DISPLAY FUNCTION

This application is a new U.S. patent application that claims benefit of JP 2017-179498 filed on Sep. 19, 2017, the content of JP 2017-179498 is incorporated herein by reference.

BACKGROUND OF THE INVENTION

1. Field of the Invention

The present invention relates to an amplifier selection device, an amplifier selection method, and a computer-readable storage medium, and particularly relates to an amplifier selection device, an amplifier selection method, and a computer-readable storage medium having a power source capacity display function.

2. Description of the Related Art

A servo system selection device which selects a servo system, the system including a motor used in a machine and an amplifier that drives the motor, is known (e.g., Japanese Unexamined Patent Publication (Kokai) No. JP 2011-166953 A). The servo system selection device according to this related art includes: an input section that inputs machine information, machine operating information, and servo system information of at least one servo system being subjected to selection; a calculating section that calculates a power consumed by the servo system, when a machine is operated on the basis of the machine operating information inputted to the input section, by using machine information and the servo system information, and at least one of a total consumed power amount, a total loss, and a power efficiency for each servo system inputted to the input section; and a first output section that displays or outputs at least one of the total consumed power amount, the total loss, and the power efficiency calculated by the calculating section, for each servo system inputted to the input section.

SUMMARY OF THE INVENTION

However, the related art has a problem in that when focusing on the size of the amplifiers, the consumed power, costs, etc., selecting the optimal amplifier from among many different types of amplifiers is difficult and time-consuming.

An amplifier selection device according to an embodiment of the present disclosure includes: a motor model storage means configured to store a database containing a plurality of motor models expressing types of motors including servo motors and spindle motors along with information pertaining to an amplifier capacity and a feature amount for each of the motor models, as well as an operation program to execute a plurality of operations for each axis motor configured to drive respective axes in a machine; a motor model information obtainment means configured to obtain information pertaining to the motor models selected for each of the spindle motors and the servo motors that drive respective spindle axes and servo axes necessary to configure a desired system; an amplifier number calculation means configured to calculate necessary numbers of each spindle amplifier and servo amplifier for each amplifier capacity by referring to the database and extracting information pertaining to the amplifier capacities of the selected motor models; a spindle amplifier selection means configured to select spindle amplifiers to drive the spindle motors on the basis of the amplifier capacities and number of spindle motors; a combination creation means configured to create a combination of servo amplifiers corresponding to the necessary amplifier capacities and numbers, for each selected spindle amplifier; a feature amount extraction means configured to extract information pertaining to a feature amount of each created combination of spindle amplifiers and servo amplifiers by referring to the database; an amplifier determination means configured to determine a combination of spindle amplifiers and servo amplifiers on a basis of the extracted information pertaining to the feature amounts; a power source capacity calculation means configured to calculate a capacity of a main power source necessary for driving the motors and a capacity of a control power source necessary for driving the spindle amplifiers and the servo amplifiers by referring to the database; a consumed power calculation means configured to calculate time series data of a total value of power consumed by the motors for all axes when the operation program is executed; and a display control means configured to display the combination of spindle amplifiers and servo amplifiers selected by the amplifier determination means, and display the time series data of the total value of the power consumed by the motors for all axes along with the main power source capacity and the control power source capacity calculated by the power source capacity calculation means.

An amplifier selection method according to an embodiment of the present disclosure includes: preparing a database containing a plurality of motor models expressing types of motors including servo motors and spindle motors along with information pertaining to an amplifier capacity and a feature amount for each of the motor models, as well as an operation program to execute a plurality of operations for each axis motor configured to drive respective axes in a machine; obtaining information pertaining to the motor models selected for each of the spindle motors and the servo motors that drive respective spindle axes and servo axes necessary to configure a desired system; calculating necessary numbers of each spindle amplifier and servo amplifier for each amplifier capacity by referring to the database and extracting information pertaining to the amplifier capacities of the selected motor models; selecting spindle amplifiers to drive the spindle motors on the basis of the amplifier capacities and number of spindle motors; creating a combination of spindle amplifiers and servo amplifiers corresponding to the necessary amplifier capacities and numbers, for each selected spindle amplifier; extracting information pertaining to a feature amount of each created combination of spindle amplifiers and servo amplifiers by referring to the database; determining a combination of spindle amplifiers and servo amplifiers on a basis of the extracted information pertaining to the feature amounts; calculating a capacity of a main power source necessary for driving the motors and a capacity of a control power source necessary for driving the spindle amplifiers and the servo amplifiers by referring to the database; calculating time series data of a total value of power consumed by the motors for all axes when the operation program is executed; and displaying the selected combination of spindle amplifiers and servo amplifiers, and displaying the time series data of the total value of the power consumed by the motors for all axes along with the calculated main power source capacity and control power source capacity.

A computer-readable storage medium according to an embodiment of the present disclosure storages an amplifier selection program that causes a computer to execute: a motor model storage process for storing a database containing a plurality of motor models expressing types of motors including servo motors and spindle motors along with information pertaining to an amplifier capacity and a feature amount for each of the motor models, as well as an operation program to execute a plurality of operations for each axis motors configured to drive respective axes in a machine; a motor model information obtainment process for obtaining information pertaining to the motor models selected for each of the spindle motors and the servo motors that drive respective spindle axes and servo axes necessary to configure a desired system; an amplifier number calculation process for calculating necessary numbers of each spindle amplifier and servo amplifier for each amplifier capacity by referring to the database and extracting information pertaining to the amplifier capacities of the selected motor models; a spindle amplifier selection process for selecting spindle amplifiers to drive the spindle motors on a basis of the amplifier capacities and number of spindle motors; a combination creation process for creating a combination of servo amplifiers corresponding to the necessary amplifier capacities and numbers, for each selected spindle amplifier; a feature amount extraction process for extracting information pertaining to a feature amount of each created combination of spindle amplifiers and servo amplifiers by referring to the database; an amplifier determination process for determining a combination of spindle amplifiers and servo amplifiers on a basis of the extracted information pertaining to the feature amounts; a power source capacity calculation process for calculating a capacity of a main power source necessary for driving the motors and a capacity of a control power source necessary for driving the spindle amplifiers and the servo amplifiers by referring to the database; a consumed power calculation process for calculating time series data of a total value of power consumed by the motors for all axes when the operation program is executed; and a display process for displaying the combination of spindle amplifiers and servo amplifiers selected in the amplifier determination process, and displaying the time series data of the total value of the power consumed by the motors for all axes along with the main power source capacity and the control power source capacity calculated in the power source capacity calculation process.

BRIEF DESCRIPTION OF THE DRAWINGS

The objects, features and advantages of the invention will become more apparent from the following description of the embodiments in connection with the accompanying drawings, wherein:

FIG. 6 is a table illustrating an example of numbers for each of amplifier capacities of motors selected for each servo axis and spindle axis;

FIG. 14 is a table illustrating another example of servo motor and spindle motor models, along with amplifier capacities, selected for each servo axis and spindle axis;

FIG. 15 is a table illustrating another example of numbers for each of amplifier capacities of motors selected for each servo axis and spindle axis;

DETAILED DESCRIPTION

An amplifier selection device, an amplifier selection method, and a computer-readable storage medium according to embodiments of the present disclosure will be described hereinafter with reference to the drawings. Note, however, that the technical scope of the present invention is not limited to these embodiments, and extends to the invention as disclosed in the scope of the patent claims and their equivalents.

Figure 1:
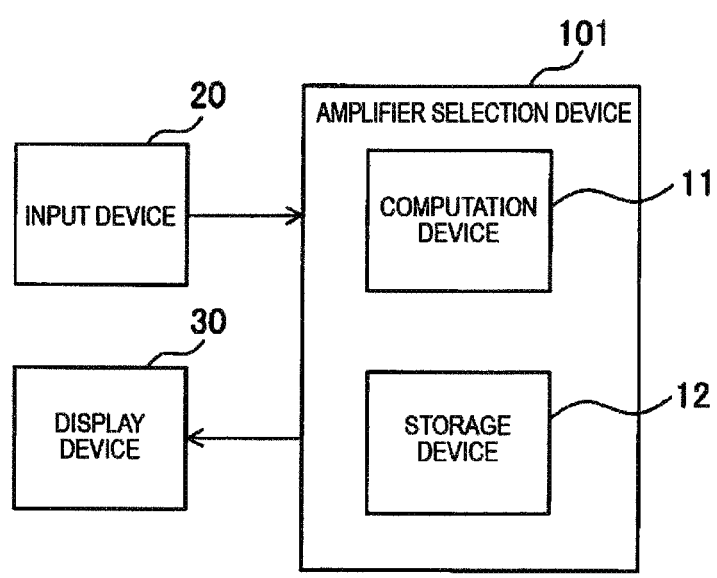
FIG. 1 is a block diagram illustrating an amplifier selection device according to a first embodiment.

FIG. 1 is a block diagram illustrating an amplifier selection device according to a first embodiment. An amplifier selection device 101 includes a computation device (a computer) 11 and a storage device 12. The storage device 12 is a hard disk (HDD), flash memory, etc., for example, and stores an amplifier selection program according to the first embodiment and a machine operation program. The computation device 11 executes the amplifier selection program according to the first embodiment, which is stored in the storage device 12. The amplifier selection device 101 is provided with an input device 20 and a display device 30. The amplifier selection program may be stored in a computer-readable storage medium.

Figure 2:
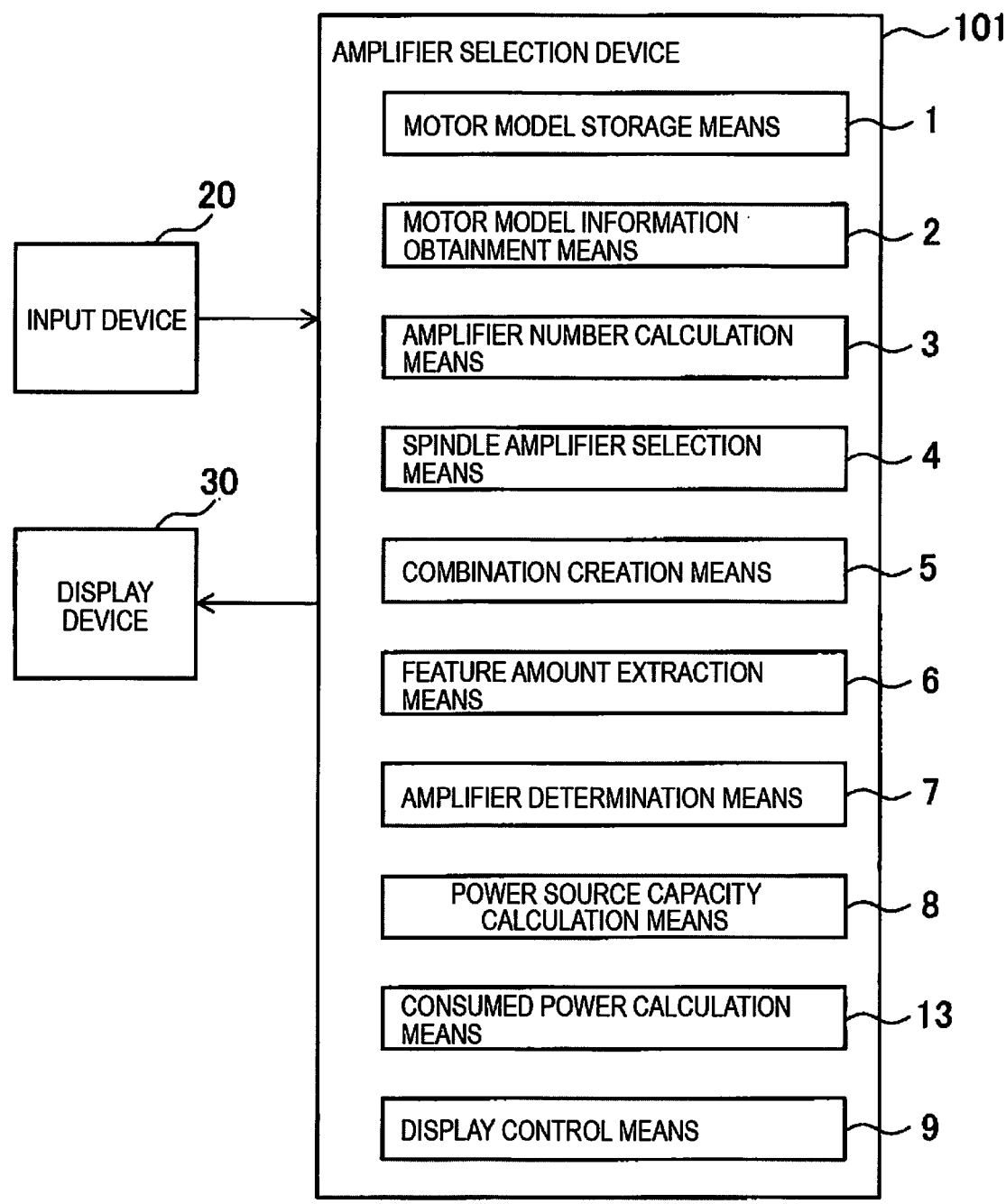
FIG. 2 is a function block diagram illustrating the amplifier selection device according to the first embodiment.

FIG. 2 is a function block diagram illustrating the amplifier selection device according to the first embodiment. The amplifier selection device 101 according to the first embodiment includes a motor model storage means 1, a motor model information obtainment means 2, an amplifier number calculation means 3, a spindle amplifier selection means 4, a combination creation means 5, a feature amount extraction means 6, an amplifier determination means 7, a power source capacity calculation means 8, a consumed power calculation means 13, and a display control means 9. The motor model storage means 1 are realized by the storage device 12 illustrated in FIG. 1, and the motor model information obtainment means 2, the amplifier number calculation means 3, the spindle amplifier selection means 4, the combination creation means 5, the feature amount extraction means 6, the amplifier determination means 7, the power source capacity calculation means 8, the consumed power calculation means 13, and the display control means 9 are realized by the computation device 11 illustrated in FIG. 1.

A keyboard, a mouse, etc., can be used as the input device 20, for example. A number of servo axes and spindle axes constituting a desired machine tool system, and information pertaining to servo motors and spindle motors used for the servo axes and the spindle axes, are inputted to the amplifier selection device 101 through the input device 20.

A liquid-crystal display device, an organic EL display device, etc., can be used as the display device 30. A screen for inputting information through the input device 20, an optimal amplifier combination and power source capacity determined by the amplifier selection device 101, etc., are displayed in the display device 30.

Figure 3:
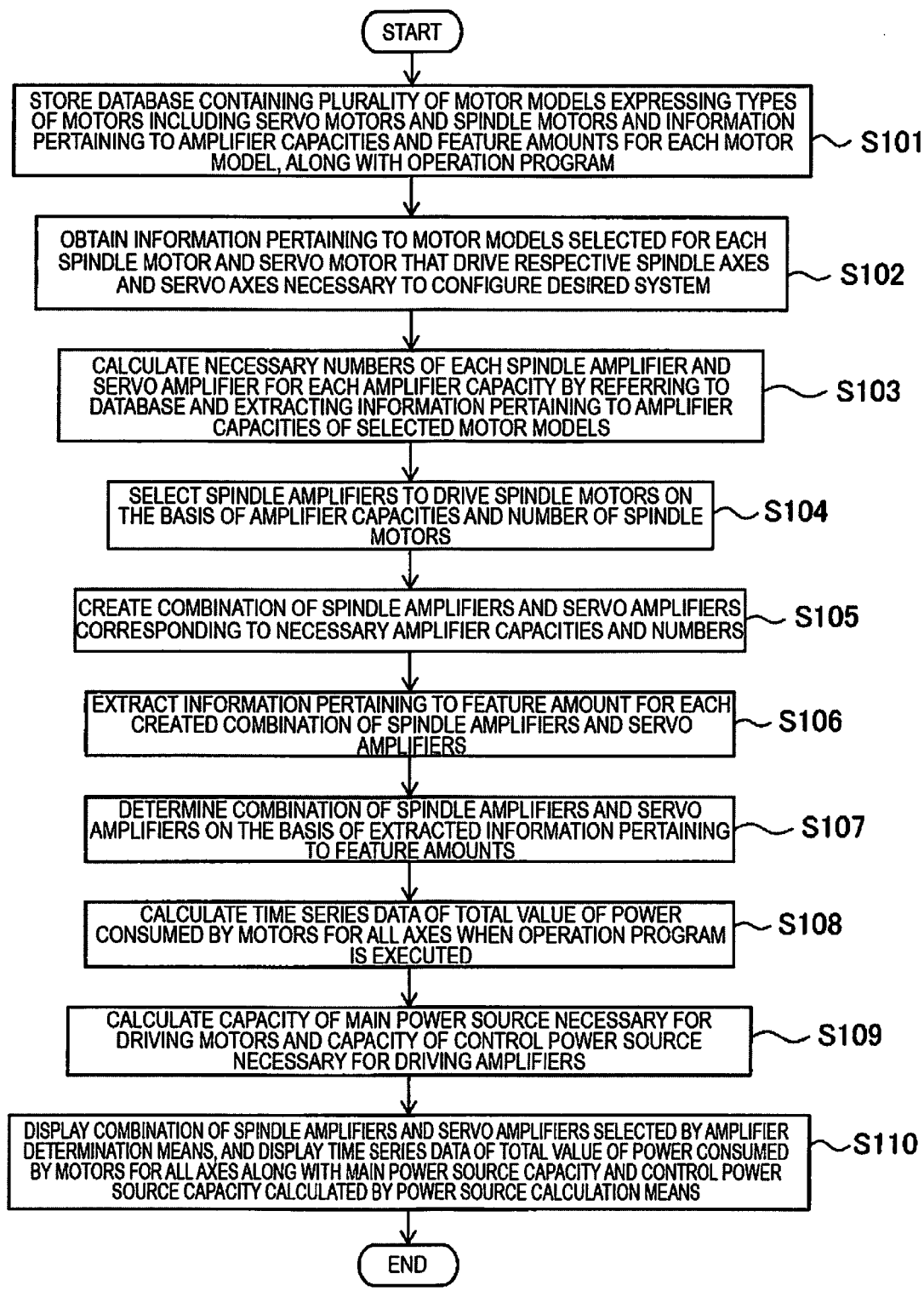
FIG. 3 is a flowchart illustrating an amplifier selection sequence in an amplifier selection method according to the first embodiment.

FIG. 3 is a flowchart illustrating an amplifier selection sequence in an amplifier selection method according to the first embodiment.

In step S101, the motor model storage means 1 store a database containing a plurality of motor models expressing types of motors including servo motors and spindle motors along with information pertaining to an amplifier capacity and a feature amount for each of the motor models, as well as an operation program for causing motors that drive respective axes in a machine to execute a plurality of operations (a motor model storage process). The information pertaining to the amplifier capacity can be expressed as a required current, a required power, etc. The feature amount can include, for example, information pertaining to the size of the amplifier, such as the width of the amplifier, information pertaining to the power consumed by the amplifier, or information pertaining to the cost, etc., of the amplifier. The information is not limited to these values, however. Information pertaining to a model name of the motor denoted in a spec sheet, the specifications of the motor, the feature amount (size, consumed power, cost, etc.) of the motor, a model name of the amplifier, the specifications of the amplifier, and the feature amount (size, consumed power, cost, etc.) of the amplifier may be recorded in the database.

Figures 4, 5:
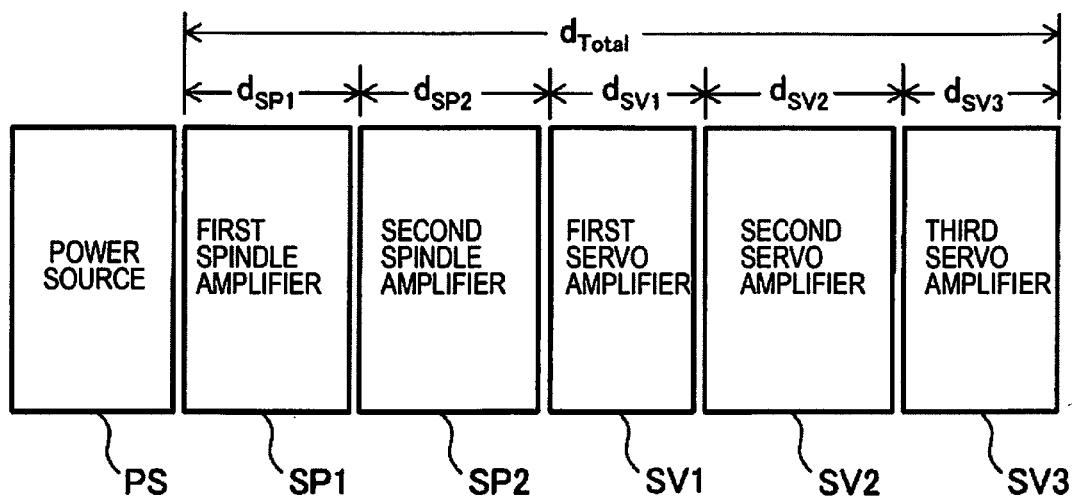
FIG. 4 is a diagram illustrating an example of the arrangement of a power source, spindle amplifiers, and servo amplifiers.
FIG. 5 is a table illustrating an example of servo motor and spindle motor models, along with amplifier capacities, selected for each servo axis and spindle axis.

FIG. 4 is an example of the configuration of the machine tool system for driving the spindle motors and the servo motors. A case where there are two spindle axes and three servo axes will be described as an example. In this case, two spindle motors are needed for the two spindle axes. Thus, a first spindle amplifier SP1 and a second spindle amplifier SP2, for driving the respective spindle motors, are connected to a power source PS. Furthermore, three servo motors are needed for the three servo axes. Thus, a first servo amplifier SV1, a second servo amplifier SV2, and a third servo amplifier SV3, for driving the respective servo motors, are connected to the power source PS.

When the width of the first spindle amplifier SP1 is represented by $d_{SP1}$, the width of the second spindle amplifier SP2 by $d_{SP2}$, the width of the first servo amplifier SV1 by $d_{SV1}$, the width of the second servo amplifier SV2 by $d_{SV2}$, and the width of the third servo amplifier SV3 by $d_{SV3}$, a total width $d_{Total}$ of the spindle amplifiers and the servo amplifiers is the total of these values. Thus, when selecting a configuration having a minimum total width for the spindle amplifiers and the servo amplifiers, the values of the widths of the spindle amplifiers and the servo amplifiers can be used as the feature amounts.

Next, in step S102, the motor model information obtainment means 2 obtain information pertaining to the motor models selected for each of the spindle motors and the servo motors that drive the respective spindle axes and servo axes necessary to configure the desired system (a motor model information obtainment process).

FIG. 5 is a table illustrating an example of servo motor and spindle motor models, along with amplifier capacities, selected for each servo axis and spindle axis. In the example illustrated in FIG. 5, there is one spindle axis (SP) and five servo axes (X-axis to B-axis). "αiS . . . " represents the motor models of the servo motors, whereas "αiI . . . " represents the motor model of the spindle motor. "20 A" and "40 A" represent the amplifier capacities necessary for driving each of the servo motors, whereas "5.5 kW" represents the amplifier capacity necessary for driving the spindle motor.

Next, in step S103, the amplifier number calculation means 3 calculate the necessary numbers of each spindle amplifier and servo amplifier for each amplifier capacity by referring to the database and extracting information pertaining to the amplifier capacities of the selected motor models (an amplifier number calculation process).

FIG. 6 is a table illustrating an example of numbers for each of amplifier capacities of motors selected for each servo axis and spindle axis. The example illustrated in FIG. 6 indicates that, with respect to the servo motors driving the servo axes, three servo amplifiers having an amplifier capacity of "20 A" are needed, and two servo amplifiers having an amplifier capacity of "40 A" are needed. With respect to the spindle motor driving the spindle axis, one spindle amplifier having an amplifier capacity of "5.5 kW" is also needed.

Next, in step S104, the spindle amplifier selection means 4 select the spindle amplifiers to drive the spindle motors on the basis of the amplifier capacities and number of spindle motors (a spindle amplifier selection process).

Figure 7:
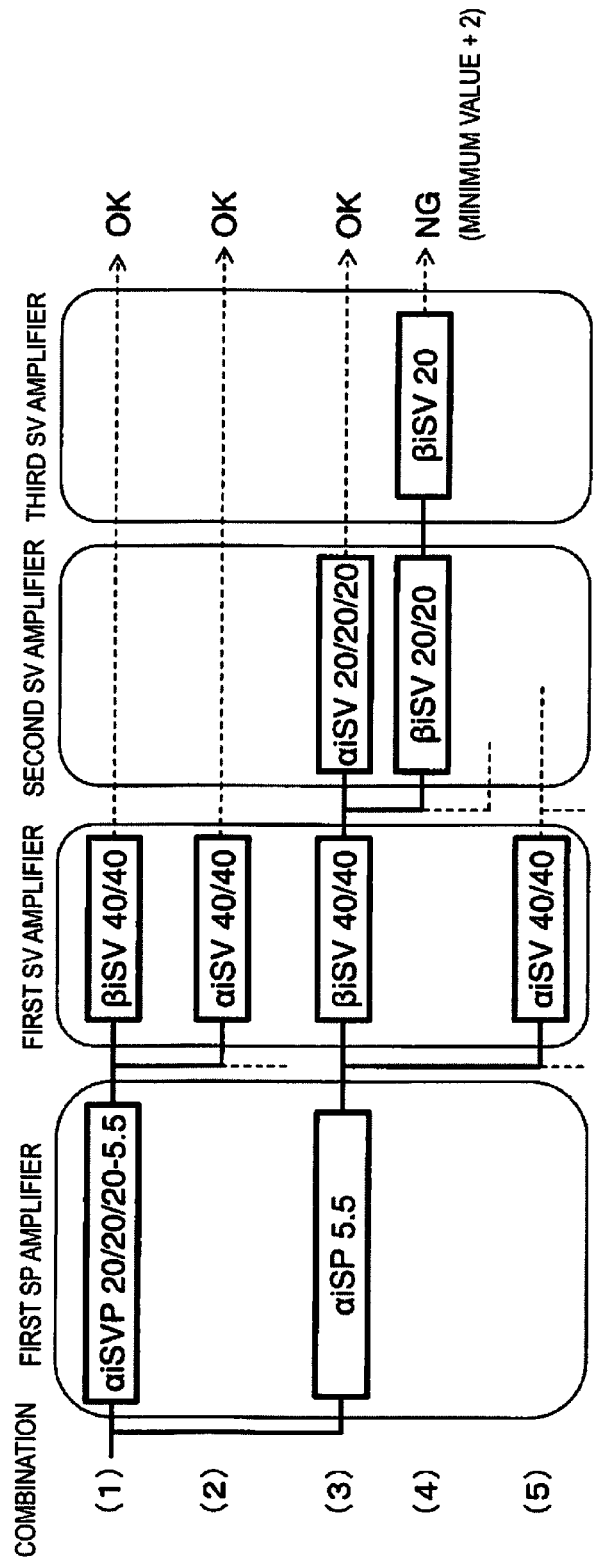
FIG. 7 is a diagram illustrating an example of combinations of spindle amplifiers and servo amplifiers capable of driving selected spindle motors and servo motors.

FIG. 7 is a diagram illustrating an example of combinations of spindle amplifiers and servo amplifiers capable of driving selected spindle motors and servo motors. The example in FIG. 7 indicates that two candidates have been selected for the spindle amplifier (first SP amplifier), namely "αiSVP 20/20/20-5.5" and "αiSP 5.5". "αiSVP 20/20/20-5.5" indicates that the spindle amplifier has a capacity of 5.5 kW, and that three servo amplifiers capable of driving three servo motors having capacities of 20 A are combined. In this manner, information pertaining to spindle amplifiers or servo amplifiers, capable to drive a plurality of spindle axes or servo axes by using one of the above amplifier, may be included in the database. On the other hand, "αiSP 5.5" indicates a single spindle amplifier having a capacity of 5.5 kW.

Next, in step S105, the combination creation means 5 create a combination of servo amplifiers corresponding to the necessary amplifier capacities and numbers, for each selected spindle amplifier (a combination creation process).

As illustrated in FIG. 7, in a case where "αiSVP 20/20/20-5.5" has been selected as the spindle amplifier, two servo amplifiers, each having a capacity of 40 A, are needed as the servo amplifiers. Accordingly, "βiSV 40/40" and "αiSV 40/40" are selected as a first servo amplifier (first SV amplifier), for example. "40/40" indicates that two servo amplifiers, each having a capacity of 40 A, are combined into a single servo amplifier. Furthermore, "α" and "β" indicate series names of the amplifiers. Thus as illustrated in FIG. 7, a first combination ((1) a combination of "αiSVP 20/20/20-5.5" and "βiSV 40/40") and a second combination ((2) a combination of "αiSVP 20/20/20-5.5" and "αiSV 40/40") can be selected as the combination of spindle amplifiers and servo amplifiers that drive the system illustrated in FIG. 5.

Furthermore, the single spindle amplifier "αiSP 5.5" can also be selected as the spindle amplifier (the first SP amplifier), for example. In this case, because the spindle amplifier does not include a servo amplifier, it is necessary to further select two servo amplifiers, each having an amplifier capacity of 40 A, and three servo amplifiers, each having an amplifier capacity of 20 A. Thus, the servo amplifier "βiSV 40/40" or "αiSV 40/40", which have an amplifier capacity of 40 A, are selected as the first servo amplifier (the first SV amplifier). In a case where the servo amplifier "βiSV 40/40" has been selected, "αiSV 20/20/20", in which three servo amplifiers are combined, each having an amplifier capacity of 20 A, is selected as a second servo amplifier (a second SV amplifier), for example. Alternatively, for example, "βiSV 20/20", in which two servo amplifiers are combined, each having an amplifier capacity of 20 A, may be selected as the second servo amplifier (the second SV amplifier), and "βiSV 20", which is a single servo amplifier having an amplifier capacity of 20 A, may be selected as a third servo amplifier (a third SV amplifier). In this manner, a third combination ((3) a combination of "αiSP 5.5", "βiSV 40/40", and "αiSV 20/20/20") and a fourth combination ((4) a combination of "αiSP 5.5", "βiSV 40/40", "βiSV 20/20", and "βiSV 20") are created. Although combinations (5) and on, including "αiSP 5.5" and "αiSV 40/40", can also be created, the following will not give detailed descriptions thereof.

In this embodiment, in focusing on the sizes (widths) or costs of the amplifiers as the feature amounts, it is considered appropriate to exclude combinations having too high a number of amplifiers when making an amplifier selection capable of achieving a reduction in size, power consumption or costs. Thus, in a case where there are a plurality of combinations of spindle amplifiers and servo amplifiers, it is preferable that the combination creation means 5 calculate the total value of the number of spindle amplifiers and servo amplifiers in each combination as well as the minimum value of that total value, and exclude, from options for selection, combinations in which the total value of the number of spindle amplifiers and servo amplifiers is higher than the minimum value by greater than or equal to a predetermined number. For example, in the example illustrated in FIG. 7, the total value of the number of spindle amplifiers and servo amplifiers is two in combinations (1) and (2), three in combination (3), and four in combination (4). The minimum value of the total value is therefore two. In a case where combinations having a number higher than the minimum value of the total value by two or more are to be excluded, the total value of combination (4) is four, and thus combination (4) can be excluded. As a result, the combinations under consideration are narrowed down to (1) to (3). In this manner, excluding combinations in which the total number of amplifiers is higher than the minimum value by greater than or equal to a predetermined number makes it possible to reduce the total number of combination candidates, and thus the optimal amplifiers can be determined quickly.

Next, in step S106, the feature amount extraction means 6 extract information pertaining to the feature amount of each created combination of spindle amplifiers and servo amplifiers by referring to the database (a feature amount extraction process).

Figure 8:
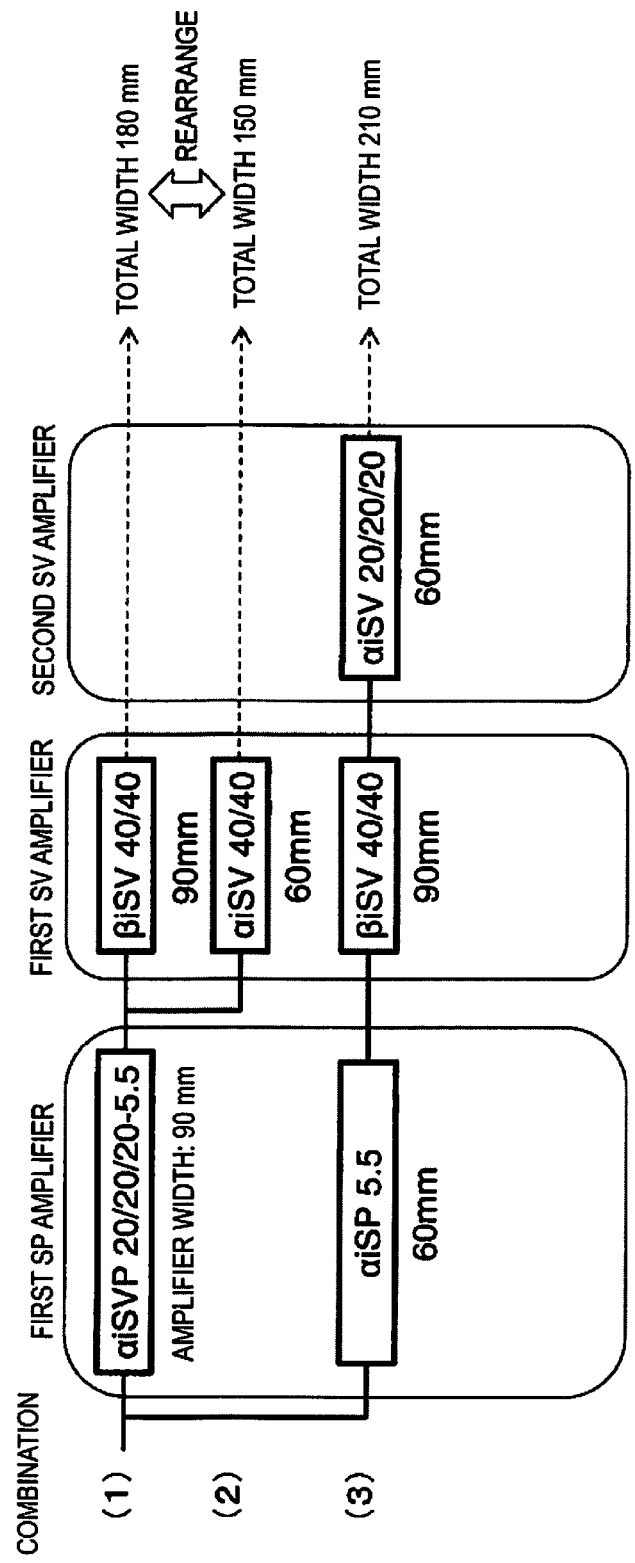
FIG. 8 is a diagram illustrating an example of total widths of amplifiers calculated for combinations of spindle amplifiers and servo amplifiers.

FIG. 8 is a diagram illustrating examples of total widths of the amplifiers calculated for the combinations of spindle amplifiers and servo amplifiers. In the example illustrated in FIG. 8, the feature amount used as a reference for determining amplifiers combinations is the width of the amplifiers. The database contains data indicating that the amplifier width of the spindle amplifier "αiSVP 20/20/20-5.5" is 90 mm, the amplifier width of the servo amplifier "βiSV 40/40" is 90 mm, and the amplifier width of the servo amplifier "αiSV 40/40" is 60 mm. Accordingly, the feature amount extraction means 6 refer to the database, and extract information pertaining to the amplifier widths, which are feature amounts, for each of the created combinations (1) to (3) of spindle amplifiers and servo amplifiers. In this case, the total values of the widths of the spindle amplifier (the first SP amplifier), the first servo amplifier (the first SV amplifier), and the second servo amplifier (the second SV amplifier) are 180 mm for combination (1), 150 mm for combination (2), and 210 mm for combination (3).

Next, in step S107, the amplifier determination means 7 determine the combination of spindle amplifiers and servo amplifiers on the basis of the extracted information pertaining to the feature amounts (an amplifier determination process).

In a case where the amplifier widths are the feature amounts, the combination (2) is the combination with the lowest amplifier width, and thus the combination (2) can be determined to be the optimal amplifier combination. After the feature amounts have been calculated for each combination, a list of combinations rearranged in ascending or descending order according to the feature amount values may be displayed in the display device 30. Alternatively, only the optimal combination, according to the feature amounts may be displayed in the display device 30.

Figures 9, 10:
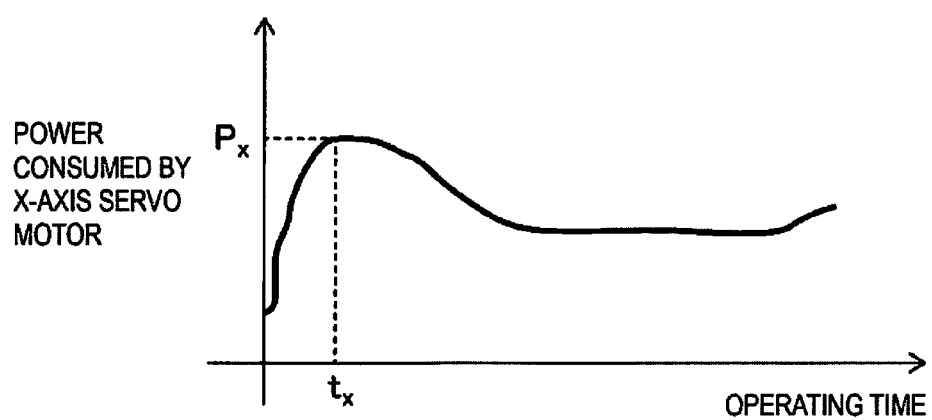
FIG. 9 is an example of an operation program that drives motors for each of axes.
FIG. 10 is an example of time series data of power consumed by an X-axis servo motor when an operation program is executed.

Next, in step S108, the consumed power calculation means 13 calculate time series data of the total value of power consumed by the motors for all axes when the operation program is executed (a consumed power calculation process). FIG. 9 is an example of an operation program that drives the motor for each of the axes. A configuration in which a machine such as a robot is driven by X-axis, Y-axis, and Z-axis servo motors will be described here as an example.

First, in the first line of the operation program, the X-axis servo motor is rotated at 70% of its rating. When the rating is represented by $\alpha_x$ [W], a time $t_x$ and a consumed power $\alpha_x \times 0.7$ when the X-axis servo motor is driven, at the first line of the operation program, are recorded. The times and power consumed by the X-axis servo motor at the other lines are recorded as well, and a graph of time series data of the power consumed by the X-axis servo motor when the operation program is executed is created, as illustrated in FIG. 10. In FIG. 10, the horizontal axis represents the operating time of the machine, which corresponds to the execution time of the operation program, and the vertical axis represents the power consumed by the X-axis servo motor. In the example illustrated in FIG. 10, the power consumed by the X-axis servo motor takes on a maximum value $P_x$ at a certain time.

Figure 11:
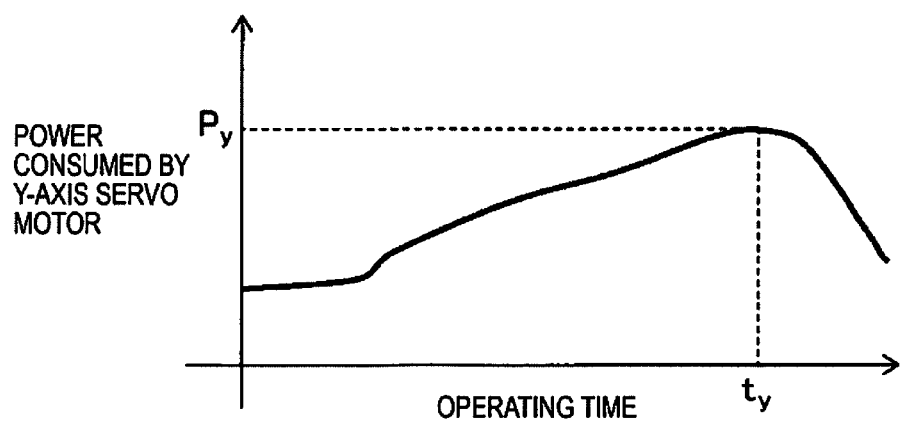
FIG. 11 is an example of time series data of power consumed by a Y-axis servo motor when an operation program is executed.

Next, in the second line of the operation program, the Y-axis servo motor is rotated at 40% of its rating four seconds after the command in the first line was executed. When the rating is represented by $\alpha_y$ [W], a time $t_y$ and a consumed power $\alpha_y \times 0.4$ when the Y-axis servo motor is driven, at the second line of the operation program, are recorded. The times and power consumed by the Y-axis servo motor at the other rows are recorded as well, and a graph of time series data of the power consumed by the Y-axis servo motor when the operation program is executed is created, as illustrated in FIG. 11. In FIG. 11, the horizontal axis represents the operating time of the machine, which corresponds to the execution time of the operation program, and the vertical axis represents the power consumed by the Y-axis servo motor. In the example illustrated in FIG. 11, the power consumed by the Y-axis servo motor takes on a maximum value $P_y$ at a certain time.

Figure 12:
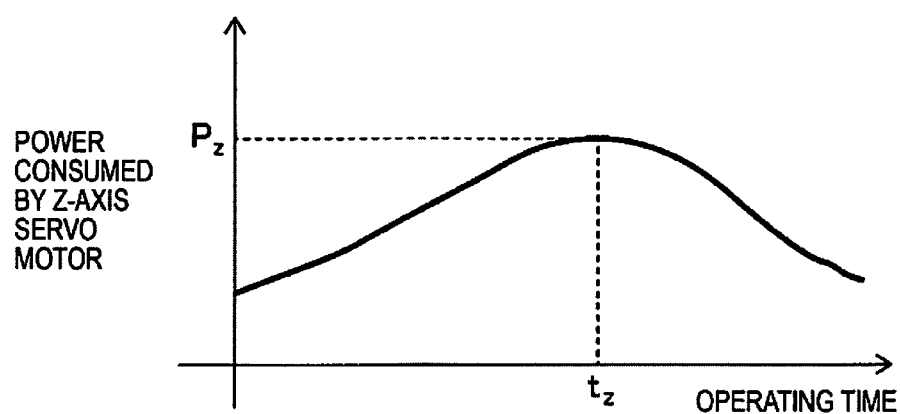
FIG. 12 is an example of time series data of power consumed by a Z-axis servo motor when an operation program is executed.

Next, in the third line of the operation program, the Z-axis servo motor is rotated at 60% of its rating six seconds after the command in the second line was executed. When the rating is represented by $\alpha_z$ [W], a time $t_z$ and a consumed power $\alpha_z \times 0.6$ when the Z-axis servo motor is driven, at the third line of the operation program, are recorded. The times and power consumed by the Z-axis servo motor at the other rows are recorded as well, and a graph of time series data of the power consumed by the Z-axis servo motor when the operation program is executed is created, as illustrated in FIG. 12. In FIG. 12, the horizontal axis represents the operating time of the machine, which corresponds to the execution time of the operation program, and the vertical axis represents the power consumed by the Z-axis servo motor. In the example illustrated in FIG. 12, the power consumed by the Z-axis servo motor takes on a maximum value $P_z$ at a certain time.

Figure 13:
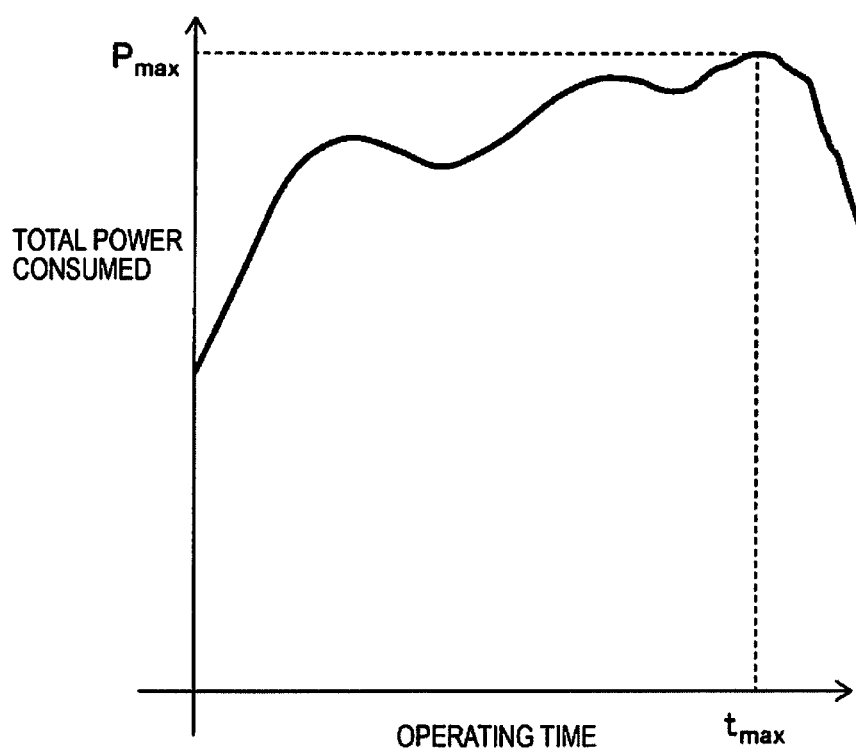
FIG. 13 is an example of time series data of a total value of power consumed by servo motors for all axes when an operation program is executed.

The consumed power calculation means 13 calculate time series data for the total value of the power consumed by the X-axis, Y-axis, and Z-axis motors when the operation program is executed. FIG. 13 is a graph of the time series data of the total value of power consumed by the servo motors for all the axes when the operation program is executed. The graph in FIG. 13 is obtained by adding the values of FIGS. 10 to 12. As can be seen from FIG. 13, the consumed power at a time $t_{max}$ is a maximum value $P_{max}$. The time series data of the total value of the power consumed by the motors for all the axes can be stored in the storage device 12 illustrated in FIG. 1.

Which axis' motor is contributing the most to power consumption can be discovered by comparing the time where the total value of the power consumed by the motors for all axes is the highest, with the times $t_x$, $t_y$, and $t_z$, where the power consumption of the X-axis, Y-axis, and Z-axis, respectively, are the highest. In the example illustrated in FIGS. 10 to 13, $t_{max}$ and $t_y$ have close values, and thus it can be seen that the Y-axis motor is causing an increase in the consumed power. In this case, the total value of the consumed power can be suppressed by rewriting the program to suppress the power consumed by the Y-axis motors, which makes it possible to reduce the capacity of a main power source.

Next, in step S109, the power source capacity calculation means 8 calculate the capacity of a main power source necessary for driving the motors and the capacity of a control power source necessary for driving the spindle amplifiers and the servo amplifiers by referring to the database (a power source capacity calculation process). The "main power source" is a three-phase AC power source of 200 V, for example, whereas the "control power source" is a power source supplied to a control circuit controlling a main circuit, and is a DC power source of 24 V, for example.

A method for calculating the capacity of the main power source will be described here. The necessary main power source capacity is calculated from the capacities of the motors that are driven. The capacities of the motors are recorded in the database in advance. A case where "a" number of servo motors are selected and "b" number of spindle motors are selected will be described. It is assumed from the database that α [W] are needed for each servo motor, and assumed from the database that β [W] are needed for each spindle motor. In this case, the capacity needed for the main power source is calculated as a×α+b×β [W]. Note that the power source capacity (power) [W] can be divided by the power factor to convert the power into an apparent power [VA].

A method for calculating the capacity of the control power source will be described next. The necessary control power source capacity is calculated from the capacities of the spindle amplifiers and the servo amplifiers. The capacities of the spindle amplifiers and the servo amplifiers are recorded in the database in advance. A case where "e" number of spindle amplifiers are selected and "f" number of servo amplifiers are selected will be described. It is assumed from the database that γ [W] are needed for each spindle amplifier, and that δ [W] are needed for each servo amplifier. In this case, the capacity needed for the control power source is calculated as e×γ+f×δ [W].

Next, in step S110, the display control means 9 display the combination of spindle amplifiers and servo amplifiers selected by the amplifier determination means, and display the time series data of the total value of the power consumed by the motors for all axes along with the main power source capacity and the control power source capacity calculated by the power source capacity calculation means (a display process). For example, the display control means 9 may display a graph illustrating the time series data of the total value of the power consumed by the servo motors for all the axes, illustrated in FIG. 13, and display "main power source: * kVA or more necessary, control power source: * W or more necessary", etc., in the display device 30. The display of the main power source capacity and the control power source capacity in the display device 30 may be executed in response to a command made to the display device 30 from outside the display device 30. For example, a command to display the power source capacity may be inputted to the display control means 9, and the power source capacity may then be displayed in the display device 30, when an icon, a button, etc., is clicked on the display device 30. Furthermore, the main power source capacity and the control power source capacity calculated by the power source capacity calculation means 8 may be stored in a storage device such as memory provided within the amplifier selection device 101, or stored in a storage medium, etc., provided outside the amplifier selection device 101.

The foregoing describes an example in which the spindle amplifiers and servo amplifiers are selected in accordance with the amplifier capacities necessary for driving the spindle motors or servo motors. However, an amplifier having a greater amplifier capacity than the necessary amplifier capacity can drive the motor, and a case where the feature amount focused on is optimal can also be considered. Thus, the combination creation means 5 may further create a combination of spindle amplifiers or servo amplifiers having amplifier capacities exceeding the amplifier capacities necessary for the selected spindle motors or servo motors.

FIG. 14 is a table illustrating another example of servo motor and spindle motor models, along with amplifier capacities, selected for each servo axis and spindle axis. Additionally, FIG. 15 is a table illustrating another example of numbers for each of the amplifier capacities of the motors selected for each servo axis and spindle axis. In the example illustrated in FIGS. 14 and 15, there is one spindle axis and eight servo axes. For the spindle motor driving the spindle axis, there is one motor having an amplifier capacity of 11 kW, and for the servo motors driving the servo axes, there are five motors each having amplifier capacities of 20 A and three motors each having amplifier capacities of 40 A.

Figure 16:
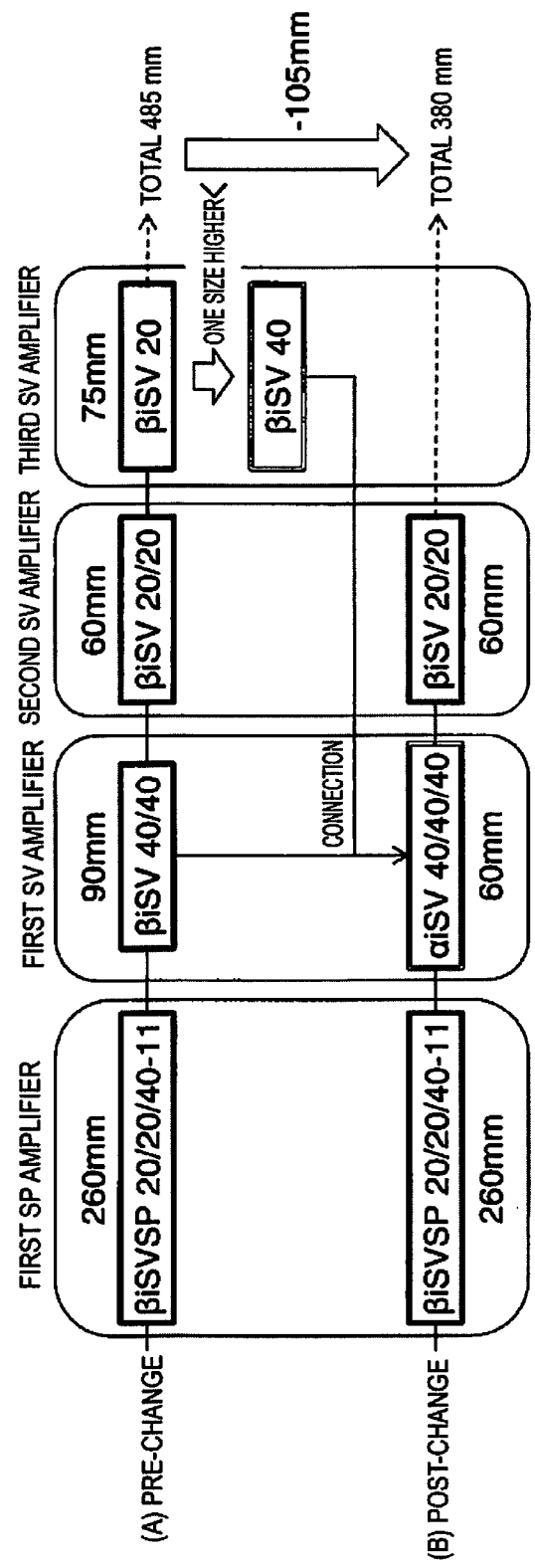
FIG. 16 is a diagram illustrating another example of total widths of amplifiers calculated for combinations of spindle amplifiers and servo amplifiers.

FIG. 16 is a diagram illustrating another example of the total widths of the amplifiers calculated for the combinations of spindle amplifiers and servo amplifiers. It is assumed that as a result of the flowchart illustrated in FIG. 3, the combination (A) in FIG. 16 has been determined to be the optimal combination among the combinations conforming to the necessary amplifier capacities illustrated in FIG. 15. It is further assumed that the total amplifier width was 485 mm for the pre-change combination (A). Focusing on the third servo amplifier (the third SV amplifier), the amplifier "βiSV 20", which has an amplifier capacity of 20 A, is selected. Although there are some amplifiers in which a plurality of amplifiers can be combined, it is assumed that neither a "20/20/20" amplifier in which three amplifiers having amplifier capacities of 20 A are combined, nor a "40/40/20" amplifier in which amplifiers having amplifier capacities of 40 A and 20 A are mixed together, are present. In such a case, it is examined whether it is possible to replace the amplifier "βiSV 20", which has an amplifier capacity of 20 A and has been selected as the third servo amplifier (the third SV amplifier), with an amplifier one size larger, i.e., an amplifier "βiSV 40", which has an amplifier capacity of 40 A, and combine that amplifier with the other amplifiers. "βiSV 40/40", in which two amplifiers having amplifier capacities of 40 A are connected and which has been selected as the first servo amplifier (the first SV amplifier), is present, and thus an amplifier "βiSV 40" having an amplifier capacity of 40 A can be further connected thereto to replace as "αiSV 40/40/40", in which three amplifiers having amplifier capacities of 40 A are connected. At this time, assuming that the total width of the amplifiers has become 380 mm, as indicated by the post-change combination (B), it can be seen that the width can be reduced by 105 mm, compared to the total width of 485 mm of the amplifiers in the pre-change combination (A). In this manner, selecting an amplifier having an amplifier capacity exceeding the necessary amplifier capacity makes it possible to further reduce the amplifier width, and thus a more optimal amplifier combination may be selected.

Figure 17:
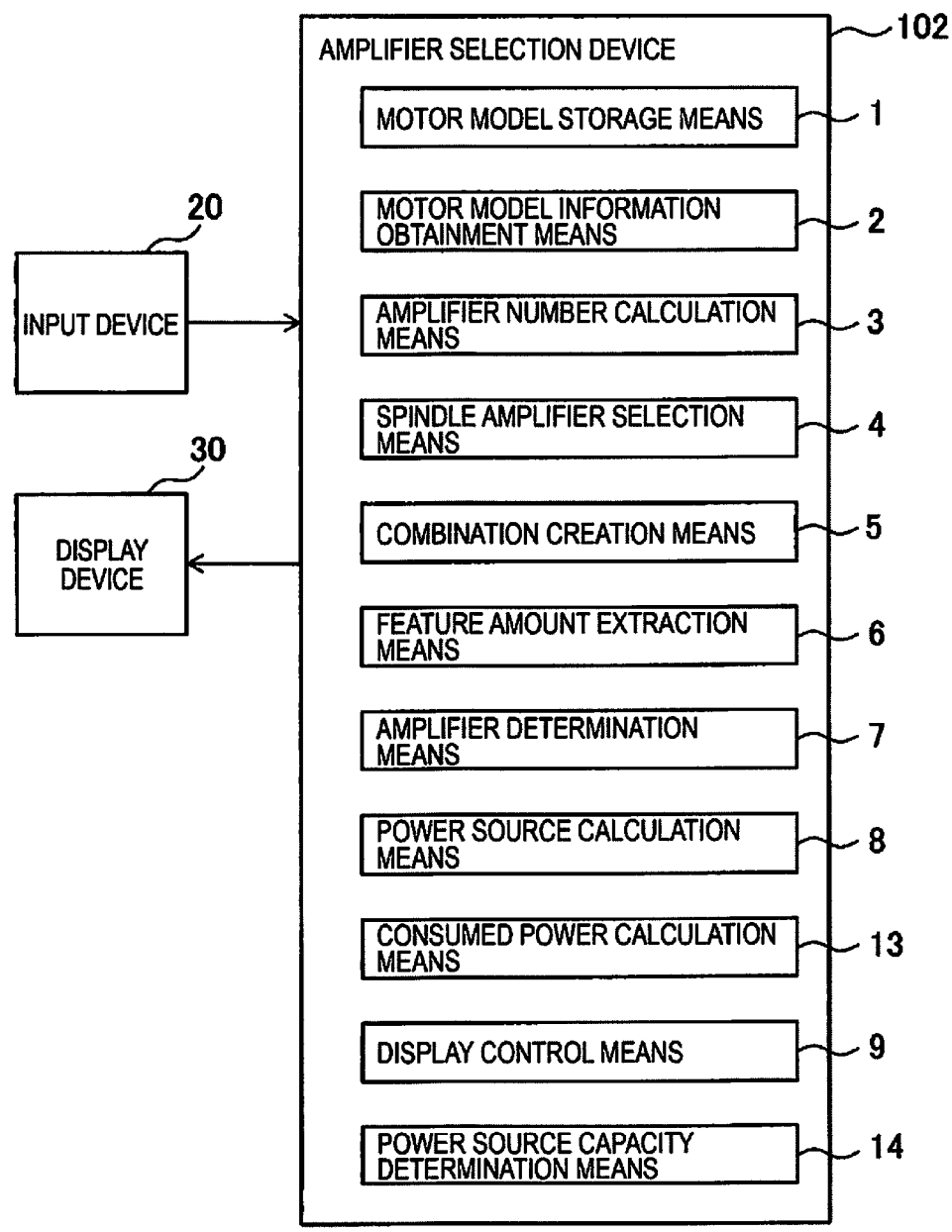
FIG. 17 is a function block diagram illustrating an amplifier selection device according to a second embodiment.

Next, an amplifier selection device according to a second embodiment will be described. FIG. 17 is a function block diagram illustrating the amplifier selection device according to the second embodiment. An amplifier selection device 102 according to the second embodiment differs from the amplifier selection device 101 according to the first embodiment in that the amplifier selection device 102 further includes a power source capacity determination means 14 that determine the capacity of the main power source on the basis of the maximum value of the power consumed by the motors obtained from the time series data of the power consumed by the motors being calculated by the consumed power calculation means 13. Other configurations of the amplifier selection device 102 according to the second embodiment are similar to those of the amplifier selection device 101 according to the first embodiment, detailed descriptions thereof will be omitted.

The power source capacity calculation means 8 refers to the database and calculates the main power source capacity necessary for driving the motors. Although rated amplifier capacities are recorded in the database, the motors for each of the axes do not always rotate at their ratings. As such, the power source capacity necessary for the main power source is thought to be lower than a value calculated with reference to the database. Accordingly, in a case where the motors for each of the axes are operated through simulations according to the operation program, it is thought that any capacity greater than the maximum value of the consumed power is sufficient for the main power source. Thus, in this embodiment, the power source capacity determination means 14 is configured to determine the capacity of the main power source on the basis of the maximum value $P_{max}$ of the power consumed by the motors, obtained from the time series data of the power consumed by the motors being calculated by the consumed power calculation means 13. Using such a configuration makes it possible to select a main power source having a suitable capacity in accordance with the operation program. Note that the power source capacity determination means 14 are realized by the computation device 11 illustrated in FIG. 1.

Although the foregoing describes an example in which the widths of the amplifiers are used as the feature amounts, the feature amounts are not limited thereto, and may be set to other values such as the power consumed by the amplifiers, the costs of the amplifiers, etc.

The foregoing describes examples in which the servo amplifiers and spindle amplifiers include a plurality of series having model names starting with "α" or "β", which are mixed together to determine the optimal amplifier combination. However, in a case where the plurality of spindle amplifiers and servo amplifiers contained in the database are classified into a plurality of series, the optimal combination may be determined on a series-by-series basis. In other words, a combination may be determined using only amplifiers having model names starting with "α", or using only amplifiers having model names starting with "β", as the servo amplifiers and the spindle amplifiers. This makes it possible to select amplifiers on a series-by-series basis, which makes it possible to determine a combination of amplifiers utilizing features common throughout the series.

With the amplifier selection device, amplifier selection method, and computer-readable storage medium according to embodiments of the present disclosure, optimal amplifiers can be easily and quickly selected from among many types of amplifiers.

What is claimed is:
1. An amplifier selection device comprising:
   a motor model storage means configured to store a database containing a plurality of motor models expressing types of motors including servo motors and spindle motors along with information pertaining to an amplifier capacity and a feature amount for each of the motor models, as well as an operation program to execute a plurality of operations for each axis motors configured to drive respective axes in a machine, wherein the feature amount includes at least one of information pertaining to size of the amplifier, information pertaining to power consumed by the amplifier, and information pertaining to cost of the amplifier;
   a motor model information obtainment means configured to obtain information pertaining to the motor models selected for each of the spindle motors and the servo motors that drive respective spindle axes and servo axes necessary to configure a desired system;
   an amplifier number calculation means configured to calculate necessary numbers of each spindle amplifier and servo amplifier for each amplifier capacity by referring to the database and extracting information pertaining to the amplifier capacities of the selected motor models;

a spindle amplifier selection means configured to select spindle amplifiers to drive the spindle motors on the basis of the amplifier capacities and number of spindle motors;

a combination creation means configured to create a combination of servo amplifiers corresponding to the necessary amplifier capacities and numbers, for each selected spindle amplifier;

a feature amount extraction means configured to extract information pertaining to a feature amount of each created combination of spindle amplifiers and servo amplifiers by referring to the database;

an amplifier determination means configured to determine a combination of spindle amplifiers and servo amplifiers on a basis of the extracted information pertaining to the feature amounts;

a power source capacity calculation means configured to calculate a capacity of a main power source necessary for driving the motors and a capacity of a control power source necessary for driving the spindle amplifiers and the servo amplifiers by referring to the database;

a consumed power calculation means configured to calculate time series data of a total value of power consumed by the motors for all axes when the operation program is executed; and a display control means configured to display the combination of spindle amplifiers and servo amplifiers selected by the amplifier determination means, and display the time series data of the total value of the power consumed by the motors for all axes along with the main power source capacity and the control power source capacity calculated by the power source capacity calculation means, wherein the combination creation means:
calculates, in the case where a plurality of combinations of spindle amplifiers and servo amplifiers are present, a total value of the number of spindle amplifiers and servo amplifiers in each combination as well as a minimum value of the total value; and
excludes, from options for selection, combinations in which the total value of the number of spindle amplifiers and servo amplifiers is higher than the minimum value by greater than or equal to a predetermined number.

2. The amplifier selection device according to claim 1, wherein the database contains information pertaining to a spindle amplifier and a servo amplifier capable to drive a plurality of spindle axes and servo axes by using one of the above amplifier.

3. The amplifier selection device according to claim 1, wherein the combination creation means further create the combination of spindle amplifiers or servo amplifiers having amplifier capacities exceeding the amplifier capacities necessary for the selected spindle motors or servo motors.

4. The amplifier selection device according to claim 1, wherein in the case where the plurality of spindle amplifiers and servo amplifiers contained in the database are classified into a plurality of series, a combination is determined for each series.

5. The amplifier selection device according to claim 1, further comprising:
a power source capacity determination means configured to determine the capacity of the main power source on a basis of a maximum value of power consumed by the motors obtained from the time series data of the power consumed by the motors being calculated by the consumed power calculation means.

6. An amplifier selection method comprising:
preparing a database containing a plurality of motor models expressing types of motors including servo motors and spindle motors along with information pertaining to an amplifier capacity and a feature amount for each of the motor models, as well as an operation program to execute a plurality of operations for each axis motors configured to drive respective axes in a machine, wherein the feature amount includes at least one of information pertaining to size of the amplifier, information pertaining to power consumed by the amplifier, and information pertaining to cost of the amplifier;

obtaining information pertaining to the motor models selected for each of the spindle motors and the servo motors that drive respective spindle axes and servo axes necessary to configure a desired system;

calculating necessary numbers of each spindle amplifier and servo amplifier for each amplifier capacity by referring to the database and extracting information pertaining to the amplifier capacities of the selected motor models;

selecting spindle amplifiers to drive the spindle motors on the basis of the amplifier capacities and number of spindle motors;

creating a combination of spindle amplifiers and servo amplifiers corresponding to the necessary amplifier capacities and numbers, for each selected spindle amplifier;

extracting information pertaining to a feature amount of each created combination of spindle amplifiers and servo amplifiers by referring to the database;

determining a combination of spindle amplifiers and servo amplifiers on a basis of the extracted information pertaining to the feature amounts;

calculating a capacity of a main power source necessary for driving the motors and a capacity of a control power source necessary for driving the spindle amplifiers and the servo amplifiers by referring to the database;

calculating time series data of a total value of power consumed by the motors for all axes when the operation program is executed; and displaying the selected combination of spindle amplifiers and servo amplifiers, and displaying the time series data of the total value of the power consumed by the motors for all axes along with the calculated main power source capacity and control power source capacity, wherein in the step of creating a combination of spindle amplifiers and servo amplifiers,
in the case where a plurality of combinations of spindle amplifiers and servo amplifiers are present, a total value of the number of spindle amplifiers and servo amplifiers in each combination as well as a minimum value of the total value are calculated; and
combinations in which the total value of the number of spindle amplifiers and servo amplifiers is higher than the minimum value by greater than or equal to a predetermined number are excluded from options for selection.

7. The amplifier selection method according to claim 6, wherein the database contains information pertaining to a spindle amplifier and a servo amplifier capable to drive a plurality of spindle axes and servo axes by using one of the above amplifier.

8. The amplifier selection method according to claim 6, wherein in the step of creating the combination of spindle amplifiers and servo amplifiers, a combination of spindle amplifiers or servo amplifiers having amplifier capacities exceeding the amplifier capacities necessary for the selected spindle motors or servo motors is further created.

9. The amplifier selection method according to claim 6, wherein in the case where the plurality of spindle amplifiers and servo amplifiers contained in the database are classified into a plurality of series, a combination is determined for each series.

10. The amplifier selection method according to claim 6, wherein the capacity of the main power source is determined on a basis of a maximum value of power consumed by the motors obtained from the calculated time series data of the power consumed by the motors.

11. A computer-readable storage medium that storages an amplifier selection program causing a computer to execute:
 a motor model storage process for storing a database containing a plurality of motor models expressing types of motors including servo motors and spindle motors along with information pertaining to an amplifier capacity and a feature amount for each of the motor models, as well as an operation program to execute a plurality of operations for each axis motors configured to drive respective axes in a machine, wherein the feature amount includes at least one of information pertaining to size of the amplifier, information pertaining to power consumed by the amplifier, and information pertaining to cost of the amplifier;
 a motor model information obtainment process for obtaining information pertaining to the motor models selected for each of the spindle motors and the servo motors that drive respective spindle axes and servo axes necessary to configure a desired system;
 an amplifier number calculation process for calculating necessary numbers of each spindle amplifier and servo amplifier for each amplifier capacity by referring to the database and extracting information pertaining to the amplifier capacities of the selected motor models;
 a spindle amplifier selection process for selecting spindle amplifiers to drive the spindle motors on a basis of the amplifier capacities and number of spindle motors;
 a combination creation process for creating a combination of servo amplifiers corresponding to the necessary amplifier capacities and numbers, for each selected spindle amplifier;
 a feature amount extraction process for extracting information pertaining to a feature amount of each created combination of spindle amplifiers and servo amplifiers by referring to the database;
 an amplifier determination process for determining a combination of spindle amplifiers and servo amplifiers on a basis of the extracted information pertaining to the feature amounts;
 a power source capacity calculation process for calculating a capacity of a main power source necessary for driving the motors and a capacity of a control power source necessary for driving the spindle amplifiers and the servo amplifiers by referring to the database;
 a consumed power calculation process for calculating time series data of a total value of power consumed by the motors for all axes when the operation program is executed; and
 a display process for displaying the combination of spindle amplifiers and servo amplifiers selected in the amplifier determination process, and displaying the time series data of the total value of the power consumed by the motors for all axes along with the main power source capacity and the control power source capacity calculated in the power source capacity calculation process,
 wherein the combination creation process further includes:
  a process for calculating, in the case where a plurality of combinations of spindle amplifiers and servo amplifiers are present, a total value of the number of spindle amplifiers and servo amplifiers in each combination as well as a minimum value of the total value; and
  a process for excluding, from options for selection, combinations in which the total value of the number of spindle amplifiers and servo amplifiers is higher than the minimum value by greater than or equal to a predetermined number.

12. The computer-readable storage medium according to claim 11, wherein the database contains information pertaining to a spindle amplifier and a servo amplifier capable to drive a plurality of spindle axes and servo axes by using one of the above amplifier.

13. The computer-readable storage medium according to claim 11, wherein the combination creation process includes a process for creating the combination of spindle amplifiers or servo amplifiers having amplifier capacities exceeding the amplifier capacities necessary for the selected spindle motors or servo motors.

14. The computer-readable storage medium according to claim 11, wherein in the case where the plurality of spindle amplifiers and servo amplifiers contained in the database are classified into a plurality of series, a combination is determined for each series.

15. The computer-readable storage medium according to claim 11, further causing the computer to execute:
 a power source capacity determination process for determining the capacity of the main power source on a basis of a maximum value of power consumed by the motors obtained from the time series data of the power consumed by the motors as calculated in the consumed power calculation process.

* * * * *